United States Patent
Kitchener et al.

(10) Patent No.: US 6,870,515 B2
(45) Date of Patent: Mar. 22, 2005

(54) MIMO WIRELESS COMMUNICATION SYSTEM

(75) Inventors: Dean Kitchener, Brentwood (GB); Martin Smith, Chelmsford (GB); Chris Ward, Bishops Stortford (GB)

(73) Assignee: Nortel Networks Limited, St. Laurent (CA)

(*) Notice: Subject to any disclaimer, the term of this patent is extended or adjusted under 35 U.S.C. 154(b) by 176 days.

(21) Appl. No.: 09/975,653

(22) Filed: Oct. 11, 2001

(65) Prior Publication Data

US 2002/0085643 A1 Jul. 4, 2002

Related U.S. Application Data

(60) Provisional application No. 60/258,838, filed on Dec. 28, 2000.

(51) Int. Cl.$^7$ ................................................. H01Q 21/24
(52) U.S. Cl. ........................ 343/853; 342/361; 343/797; 455/562.1
(58) Field of Search ................................. 343/795, 797, 343/754, 815, 853; 342/361; 455/562.1

(56) References Cited

U.S. PATENT DOCUMENTS

| | | | |
|---|---|---|---|
| 5,691,727 A | | 11/1997 | Cyzs |
| 6,067,053 A | * | 5/2000 | Runyon et al. ............. 343/797 |
| 6,144,711 A | | 11/2000 | Raleigh |
| 6,211,841 B1 | * | 4/2001 | Smith et al. ................. 343/813 |
| 6,317,098 B1 | * | 11/2001 | Andrews et al. ............. 343/797 |
| 6,697,643 B1 | * | 2/2004 | Hagerman et al. ....... 455/562.1 |

FOREIGN PATENT DOCUMENTS

EP 0895436 2/1999

OTHER PUBLICATIONS

TSGR1#16(00)1219 Practical aspects of multiple antenna architectures for HSDPA. Lucent Technologies. Pusan, South Korea, Oct. 10–13, 2000. 2 pages.

* cited by examiner

Primary Examiner—Michael C. Wimer
(74) Attorney, Agent, or Firm—Barnes & Thornburg

(57) ABSTRACT

Previous MIMO systems have used spatially diverse antenna elements in order not to reduce the number of orthogonal channels that can be realized. The present invention recognizes that this leads to large antenna sizes, as compared to multiple beam antenna systems which use closely spaced antenna elements. In order to provide a compact antenna unit, while still allowing a MIMO system to be exploited, the present invention recognizes that polarization diversity only can be used in a MIMO system without the need for spatially diverse antenna elements. Closely spaced antenna elements are used and this enables a compact MIMO antenna unit to be provided. In addition, such MIMO systems with polarization diversity but no spatial diversity can advantageously be used in line of sight situations and also combined with multi-beam antenna systems to further increase capacity.

21 Claims, 17 Drawing Sheets

A Max channel, no correlation
B Min channel, no correlation
C Max channel, complete correlation
D Min channel, complete correlation (not present)
Z Baseline 1:1

A Max channel, polarisation diversity, full polarisation conversion
B Min channel, polarisation diversity, full polarisation conversion
E Max channel, pol'n diversity, no polarisation conversion
F Min channel, pol'n diversity, no polarisation conversion
Z Baseline 1:1

P ——————— 2:2 SNR = 0dB
Q ——————— 2:2 SNR = 6dB
R ——————— 2:2 SNR = 12dB
S ——————— 2:2 SNR = 18dB
T — — — — — 1:1 SNR = 0dB
U — — — — — 1:1 SNR = 6dB
V — — — — — 1:1 SNR = 12dB
W — — — — — 1:1 SNR = 18dB

Capacity for 2.2 space diversity MIMO system with the basestation antennas (transmitter) completely correlated and the mobile completely uncorrelated.

70 ——— 2:2 SNR = 0dB
71 ——— 2:2 SNR = 6dB
72 ——— 2:2 SNR = 12dB
73 ——— 2:2 SNR = 18dB
74 ----- 1:1 SNR = 0dB
75 ----- 1:1 SNR = 6dB
76 ----- 1:1 SNR = 12dB
77 ----- 1:1 SNR = 18dB

Measured ditributions for the power gains for the orthogonal MIMO paths for 2:2 space and polarisation diversity configurations.

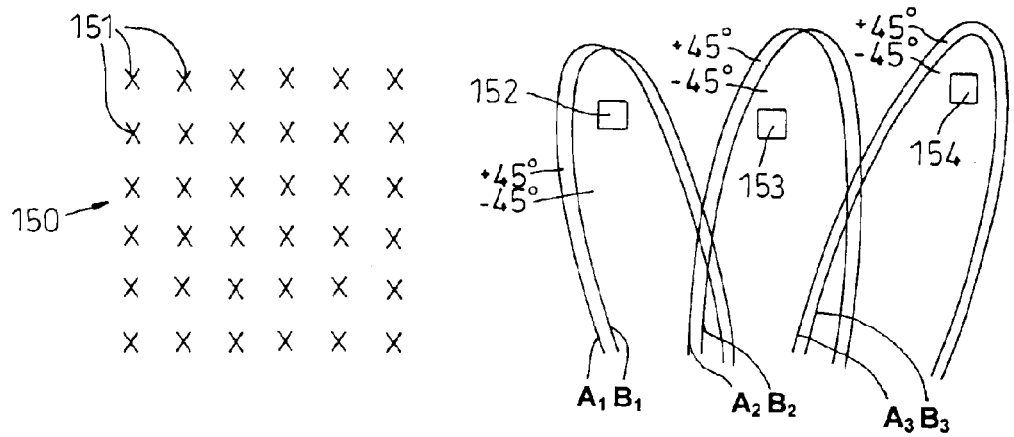
Fig. 15A  Fig. 15B
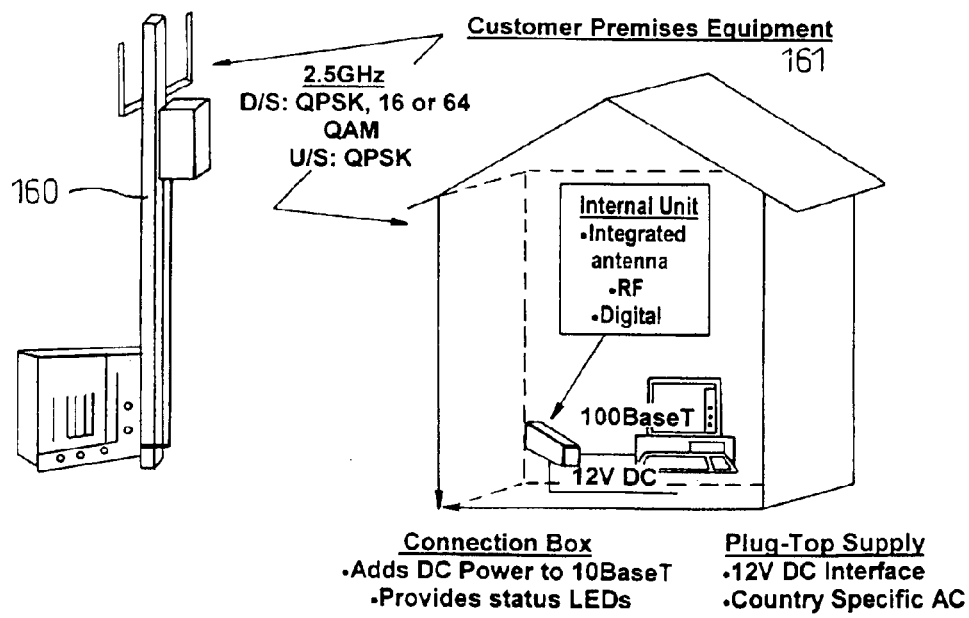
Fig 16

MIMO WIRELESS COMMUNICATION SYSTEM

RELATED APPLICATION

This application is the non-provisional filing of provisional application No. 60/258,838, filed Dec. 28, 2000.

FIELD OF THE INVENTION

The present invention relates to multiple input multiple output (MIMO) wireless communication systems. The invention is particularly related to but in no way limited to MIMO wireless communication systems which use polarisation diversity.

BACKGROUND TO THE INVENTION

A MIMO wireless communication system (see FIG. 1) is one which comprises a plurality of antennas 10 at the transmitter 11 and one or more antennas 12 at the receiver 13. The antennas 10, 12 are employed in a multi-path rich environment such that due to the presence of various scattering objects (buildings, cars, hills, etc.) in the environment, each signal experiences multipath propagation. Thus a cloud shape 14 is shown in FIG. 1 to represent the scattered signals between the transmit and receive antennas. User data is transmitted from the transmit antennas using a space-time coding (STC) transmission method as is known in the art. The receive antennas 12 capture the transmitted signals and a signal processing technique is then applied as known in the art, to separate the transmitted signals and recover the user data.

MIMO wireless communication systems are advantageous in that they enable the capacity of the wireless link between the transmitter and receiver to be improved compared with previous systems in the respect that higher data rates can be obtained. The multipath rich environment enables multiple orthogonal channels to be generated between the transmitter and receiver. Data for a single user can then be transmitted over the air in parallel over those channels, simultaneously and using the same bandwidth. Consequently, higher spectral efficiencies are achieved than with non-MIMO systems.

One problem with existing MIMO systems concerns the large size of the transmit and receive antenna arrays. Previously, MIMO transmit and receive antenna arrays have used spatially diverse antenna arrays. That is, the spacing between the individual antenna elements is arranged to be large enough such that decorrelated spatial fading is obtained. This is necessary in order to prevent the number of orthogonal channels from being reduced. That is, if the fading characteristics between antenna elements is similar (correlated) then the number of orthogonal channels that can be realised is reduced. For example, for rooftop installations, or antennas on towers, separations of up to 20 wavelengths may be required to achieve decorrelated fading due to the low angle spread of the multipath.

Another problem with existing MIMO systems is that they are designed for use in environments where scattering occurs rather than for line of sight situations. However, line of sight situations arise in many circumstances, such as communication between portable wireless devices that are close together and communication in fixed wireless access systems in which directional arrays are used at subscriber premises. This means that it has not previously peen possible to realise the potential capacity available from MIMO systems in such line of sight situations.

The spatial diversity arrangement in previous MIMO systems has also meant that such systems are incompatible with multi-beam antenna arrangements which require closely spaced antenna arrays with no spatial diversity. A multi-beam antenna arrangement is one in which a plurality of closely spaced antenna elements 21 (see FIG. 2) is used together with a beamformer 20 to form two or more directional antenna beams 23. Data to be transmitted enters on inputs 24 and is transmitted to a plurality of user equipment terminals 22. The antenna element spacing is such that no spatial diversity is present and is typically achieved with an antenna spacing of half a wavelength. By using multiple directional antenna beams in this way interference between the beams is reduced and thus downlink capacity increased. That is, the number of user equipment terminals that can be supported by a single basestation comprising the antenna array 21 is increased. This differs from a MIMO system such as that illustrated in FIG. 1, where downlink capacity is increased for a particular user or plurality of users by increasing the data rate to those users.

An object of the present invention is to provide a MIMO wireless communications system which overcomes or at least mitigates one or more of the problems noted above.

Further benefits and advantages of the invention will become apparent from a consideration of the following detailed description given with reference to the accompanying drawings, which specify and show preferred embodiments of the invention.

SUMMARY OF THE INVENTION

According to a first aspect of the present invention there is provided a multiple-input multiple-output (MIMO) wireless communications system comprising:

a plurality of transmit antenna elements; and a plurality of receive antenna elements;

wherein the transmit antenna elements are arranged to provide polarisation diversity and wherein the positions of the transmit antenna elements are arranged, such that spatial diversity is avoided.

This provides the advantage that because spatial diversity is avoided, the transmit antenna elements may be positioned closely to produce a compact antenna arrangement. This is particularly important for situations in which the antenna elements are to be incorporated into a hand held device such as a personal digital assistant (PDA), mobile telephone or other small device. Compact antenna arrangements are also advantageous for basestation installations and other outdoor installations because the visual impact created is reduced. In addition, manufacture, transport and storage costs are reduced.

The receive antenna elements may also be closely spaced to avoid spatial diversity although this is not essential.

Preferably the receive antenna elements are also arranged to provide polarisation diversity and such that spatial diversity is avoided. This provides the advantage that the receive antenna elements may be positioned closely to produce a compact receiver arrangement.

The antenna elements may be individual elements or may be an array of elements such as a column array for sector coverage. Also the antenna elements may be spaced apart or may be co-located. For example a MIMO system with two transmit or receive antenna elements can be provided where those two antenna elements are co-located, forming a dual-polar element.

Preferably each of said antenna elements is polarised at one of two substantially orthogonal polarisations. For example, horizontal and vertically polarised antenna elements may be used. Also, it is not essential for the transmit and receive antenna elements to be polarised in the same manner. For example, the transmit antenna elements can employ horizontal and vertical polarisation whilst the receive antenna elements employ right and left handed circular polarisation.

Preferably the MIMO system is arranged to operate at a particular wavelength and the inter-element spacing of the transmit antenna elements is less than one of the particular wavelength. This enables spatial diversity to be avoided and provides a compact transmit antenna design. The inter-element spacing of the receive antenna elements may be less than one of the particular wavelength, although this is not essential. That is the receive antenna may have either spatial or polarisation diversity or both.

Preferably the transmit antenna elements are together further arranged to provide a plurality of antenna beams in use. This enables MIMO communication to be combined with multi-beam communication to improve capacity. Because spatial diversity is not required, the inter-element spacing can be close enough to allow multi-beam communication.

In one example said plurality of antenna beams comprises pairs of antenna beams, each pair comprising a first antenna beam of a first polarisation and a second antenna beam, substantially identical to the first but provided at a second polarisation different from the first polarisation. This enables a MIMO link to be provided using each pair of antenna beams.

The MIMO wireless communications system may for example be selected from a 2:2 and a 2:4 MIMO system. This provides the advantage that the number of antenna elements is relatively low and this facilitates incorporating those antenna elements into portable communications devices such as mobile telephones.

According to another aspect of the present invention there is provided a multiple-input multiple-output wireless communications method comprising the steps of:

transmitting a space-time coded signal from a transmit antenna arrangement comprising a plurality of transmit antenna elements;

receiving the space-time coded signal at a receive antenna arrangement comprising a plurality of receive antenna elements;

wherein said transmit antenna elements are arranged such that polarisation diversity is provided and wherein the positions of the transmit antenna elements are arranged, such that spatial diversity is avoided.

This provides the advantage that a MIMO communication link is effected without the need for spatial diversity. For example, this enables a MIMO link to be used in a line of sight situation to enhance link capacity in those cases.

According to another aspect of the present invention there is provided an antenna arrangement for use in a multiple-input multiple-output (MIMO) wireless communications system, said antenna arrangement comprising a plurality of transmit antenna elements arranged to provide polarisation diversity and wherein the positions of said transmit antenna elements are such that spatial diversity is avoided.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which:

FIG. 3 shows the Rayleigh distribution for a 1:1 system;

FIG. 15A is a schematic diagram of an antenna array for use at a basestation in a mobile or fixed wireless access MIMO communications network.

FIG. 15B is a schematic diagram of an antenna beam configuration produced using the antenna array of FIG. 15A.

FIG. 16 is a schematic diagram of a fixed wireless access MIMO arrangement.

DETAILED DESCRIPTION OF INVENTION

Figure 1:
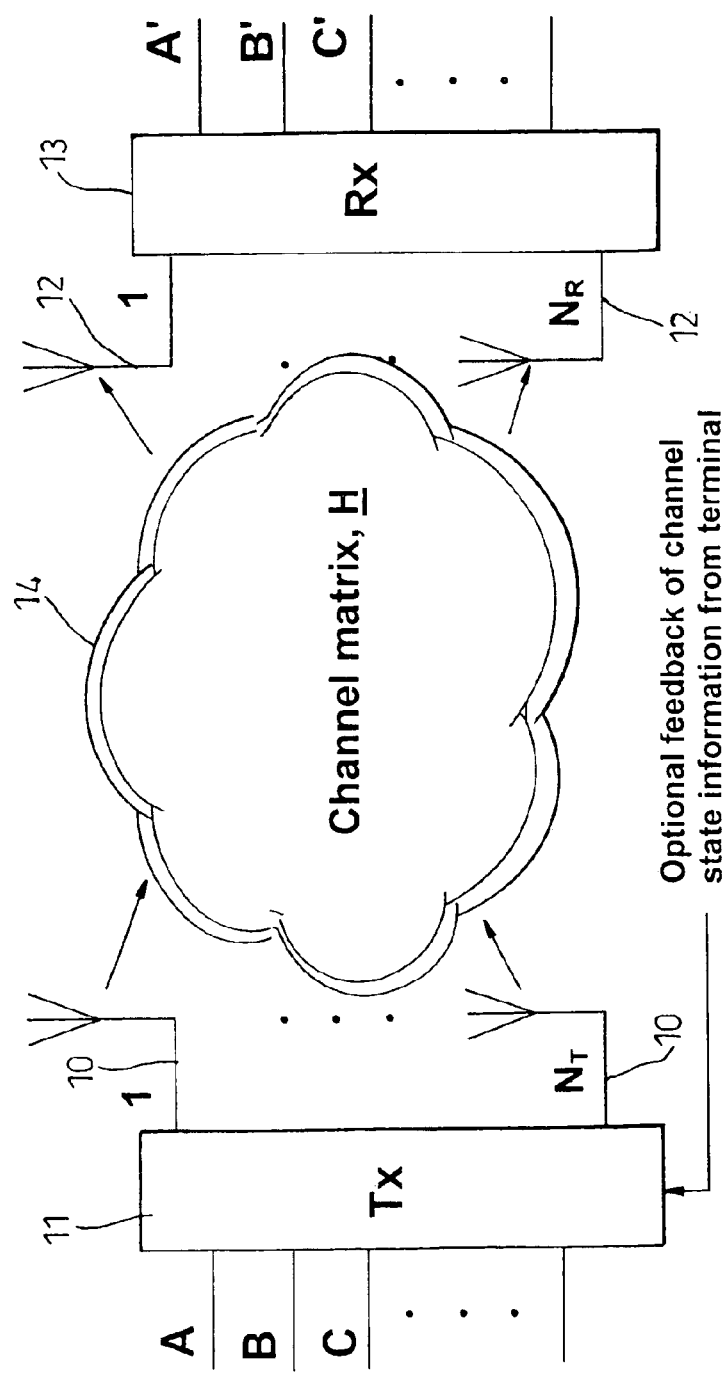
FIG. 1 is a schematic diagram of a prior art MIMO wireless communications system.

Embodiments of the present invention are described below by way of example only. These examples represent the best ways of putting the invention into practice that are currently known to the Applicant although they are not the only ways in which this could be achieved.

The term "spatial diversity" is used herein to refer to the use of antenna spacing to obtain signals with low correlation for fast fading. The antenna spacing required for low correlation depends on angle of arrival and angle spread of multipath. The lower the angle spread, the greater the spacing required.

The term "polarisation diversity" is used herein to refer to the use of different antenna polarisations to provide signals with low correlation. This is facilitated by high degrees of polarisation conversion in the propagation environment. It has the advantage that two antennas with different polarisations can share a common position.

In the examples described below, antenna elements with orthogonal polarisations are used. However, it is not essential for these polarisations to be exactly orthogonal as long as the polarisations can be discriminated by the receiver. The term "dual polarised antenna element" is used herein to refer to a single antenna aperture which effectively has two co-located antenna elements that operate at different polarisations.

As mentioned above, previous MIMO systems have used spatially diverse antenna arrays in order not to reduce the number of orthogonal channels that can be realised. The present invention recognises that this leads to large antenna arrangement sizes, as compared to multiple beam antenna systems which use closely spaced antenna elements. In order to provide a compact antenna unit, whilst still allowing a MIMO system to be exploited, the present invention recognises that polarisation diversity only can be used in a MIMO system without the need for spatially diverse antenna elements. Closely spaced antenna elements are used and this enables a compact MIMO antenna unit to be provided.

It is acknowledged that previous MIMO systems have used polarisation diversity but this has always been in addition to spatial diversity. For example, Lucent Technologies in their paper, "Practical aspects of multiple antenna architectures for HSDPA", 10–13 Oct. 2000, R1-00-1219, describe antenna spacing requirement for a multiple antenna architecture that uses a code re-use scheme. They explain that sufficient spacing among the antennas at both the base station transmitter and terminal receiver are required for uncorrelated fading. They go on to mention use of dual-polarised antennas but this is only in addition to spatial diversity.

Because the present invention enables closely spaced antenna elements to be used in MIMO systems (by using polarisation diversity instead of spatial diversity) a further advantage is achieved. This is that an arrangement with closely spaced antenna elements can be created and arranged to provide both a MIMO communication system and a multi-beam antenna system which operate simultaneously. This provides increased capacity and enables the advantages of multi-beam antenna systems to be combined with those of MIMO systems.

As mentioned above, the present invention recognises that polarisation diversity only can be used in a MIMO system without the need for spatially diverse antenna elements. This is now explained in more detail.

We have found that contrary to expectations, use of polarised antennas at the base station and the terminal of an STC system improves the resilience or robustness of the communications link, allows for the use of smaller antenna structures, and has the further benefit of maintaining multiple orthogonal channels even in a low scattering environment where there might be a strong line of sight component such as rural and suburban locations, and fixed wireless access applications. Prior art STC or MIMO systems have relied on spatially decorrelated antennas in a rich multipath environment. We have found that the use of polarised antennas in a MIMO system works surprisingly better than expected and provides the additional advantage that the STC system can operate in a low scattering environment.

This antenna configuration allows MIMO to be employed in environments where there is a strong line-of-sight component, or indeed, only a line-of-sight component. This is important since it allows MIMO to be applied to fixed wireless access schemes where the subscriber antenna is mounted on the outside of the user's premises, probably at eaves height. Also, it means that MIMO can be applied in more benign environments, such as rural areas.

Figure 3:
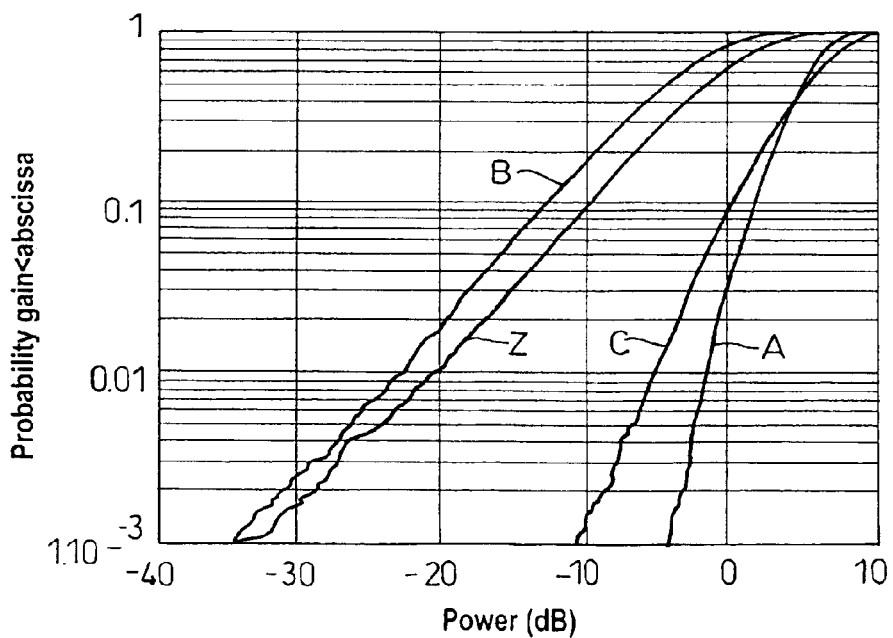
FIG. 3 is a graph of the theoretical distributions of the channel power gains for a 2:2 MIMO system with space diversity antennas for the case when the basestation antennas are completely correlated and the case when there is no correlation; in addition

For rich scattering environments the spatial fading normally fits a Rayleigh distribution, and this means that as the terminal multiple antenna configuration is moved the received signal on each element fades up and down. This results in a variation of the gains of the orthogonal channels and for a 2:2 system (i.e. two antenna elements at the transmitter and two at the receiver) employing spatially separated antennas (i.e. with spatial diversity) the distributions of the channel gains are shown in FIG. 3 (lines A and B). Similar distributions are found for 2:4, 2:n (where n is any integer greater than 2) and similar MIMO systems. Also shown in FIG. 3 is the Rayleigh distribution for a wireless link having one antenna at each end (see line Z). FIG. 3 assumes that the transmit and receive antennas have decorrelated (dissimilar) fading characteristics.

Often the angle spread at a basestation is small and this can lead to correlated fading. Correlated fading has the effect of reducing the gain of the weaker MIMO channel, and in the limit, where the base antennas become completely correlated, the gain of the weaker channel goes to zero. In other words for a 2:2, 2:4, 2:n or similar MIMO system if the antennas at one end of the link become completely correlated the number of orthogonal channels reduces to one. This also applies to 2:4, 2:n or similar MIMO systems. The distribution for the power gain then reduces to that shown by line C in FIG. 3 (i.e. line D is not present).

Figure 4:
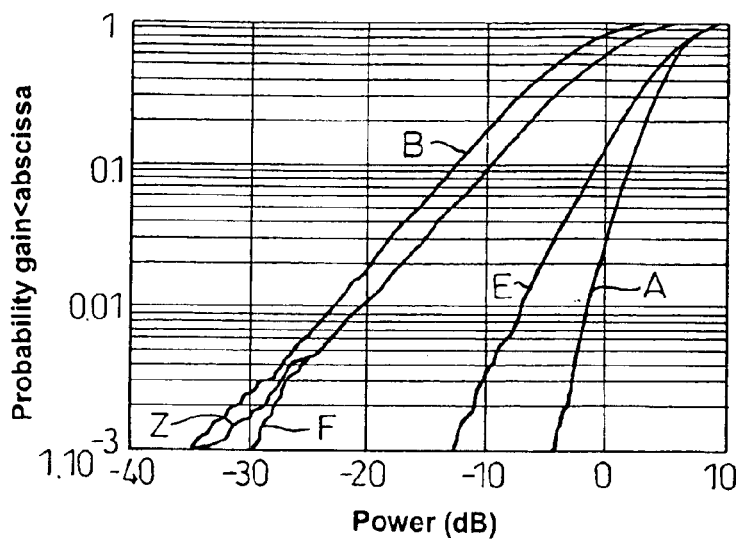
FIG. 4 is a graph of the theoretical distributions of the channel power gains for a 2:2 MIMO system when dual polar elements are used instead of spatially separated antennas with or without polarisation conversion being present.

If dual-polar elements are used instead of spatially separated antennas then for a 2:2, 2:4, 2:n or similar system the second channel is never lost. This is because in a Rayleigh fading environment the fading characteristics for different polarisations are always decorrelated. Taking a limiting case we assume no polarisation conversion in the environment but assume that multipath scattering still occurs in the environment. Two orthogonal paths exist in this case because of the two orthogonal polarisations. Therefore, the same two polarisations are used at both ends of the link. At any instant in time the stronger channel is simply the receive element with the largest received signal level. The distribution of the power gain for the strongest and weakest channels are then as shown in FIG. 4 lines E and F. These are shown compared to the distributions for a polarisation diversity configuration with no polarisation conversion (in FIG. 4 lines A and B) where the antennas at the transmit and receive ends have decorrelated fading. The main point is that even with no polarisation conversion there remain two orthogonal channels, suggesting that the use of polarisation is more robust than using space diversity.

MIMO systems normally start with the requirement of a rich scattering environment from which multiple orthogonal channels are extracted. This aspect of the invention starts from the opposite direction, by starting with an antenna configuration which already has orthogonal paths even in the absence of any multipath. Multipath scattering in the environment then perturbs the system from this initial state, and some space-time processing can be applied to retrieve the orthogonal channels. The difference is that with the existing MIMO systems which rely on space diversity, as the multipath scattering is reduced the multiple orthogonal channels disappear. With the current invention, as the multipath scattering is reduced, multiple orthogonal channels are retained.

Figure 5:
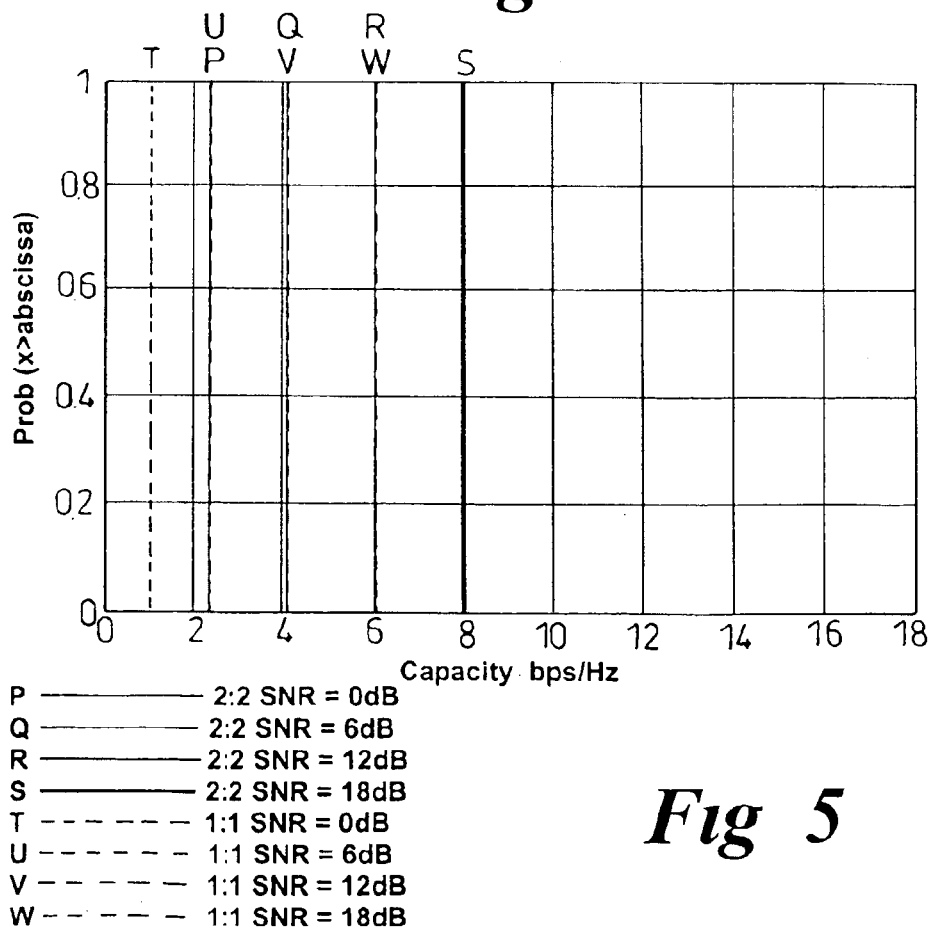
FIG. 5 is a graph showing the theoretical capacity of a 2:2 space diversity MIMO system compared to a 1:1 link in an environment with no fading for different values of signal to noise ratio.

MIMO systems have been developed with space diversity in mind because of the desire to use many antennas at each end of the radio link. However, for real systems the number of antennas to be used at each end of the link is likely to be limited to between two to four. One embodiment of this invention starts by considering the case where two antenna elements are employed at each end of the link. We observe that if we employ two spatially separated antennas at each end of the link and there is no fading then the antennas at each end will be completely correlated. In this case the best that we can do is to achieve 3 dB power gain from the two element arrays at each end of the link resulting in a total of 6 dB increase in the signal-to-noise ratio. This means that the capacity achieved compared to a link with a single antenna at each end is as shown in FIG. 5 (for different values of signal to-noise ratio, SNR).

Figure 6:
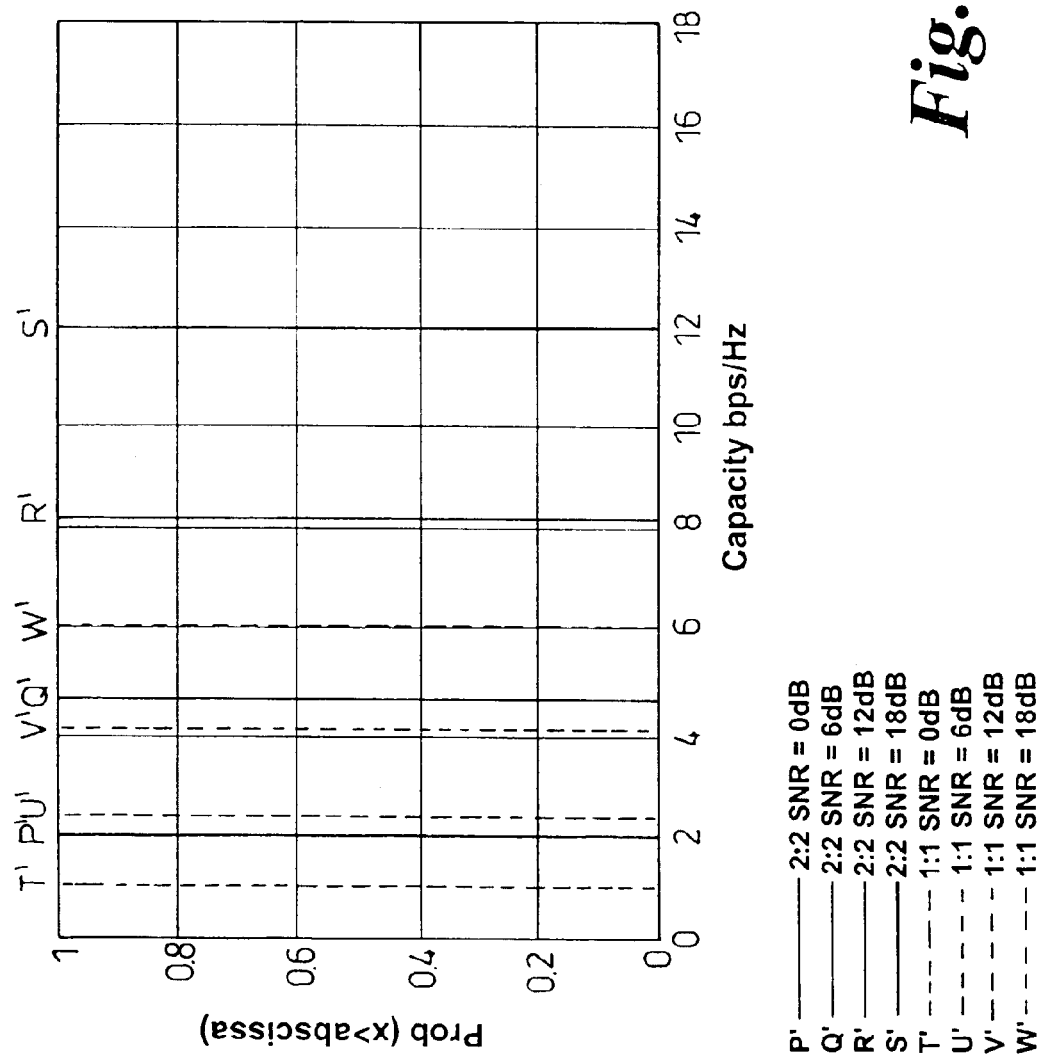
FIG. 6 is a graph similar to FIG. 5 but showing the theoretical capacity of a 2:2 polarisation diversity MIMO system (which has no space diversity) compared to a 1:1 link in an environment with no fading.

In contrast, if dual-polar elements are employed at each end of the link then two orthogonal paths already exist. Consequently, data can be transmitted in parallel over these two orthogonal paths. For example, if a vertically polarised element and a horizontally polarised element is used at each end, then the two orthogonal paths are the vertical-to-vertical link and the horizontal-to-horizontal link. In this case then the capacity of the 2:2 polarisation diversity MIMO system compared to a link with a single (co-polarised) antenna at each end of the link is shown in FIG. 6. One can see that much higher capacity gains are now achieved at locations where there is a high signal-to-noise ratio (>6 dB). This effect is also found for a 2:4, 2:n or similar MIMO system. Strictly we should compare the results to the case where we have two co-polarised elements at each end which are used for beamforming. The results for this case actually correspond exactly to the 2:2 space diversity results shown in FIG. 5, where we have a 3 dB array gain at each end of the link. Then comparing the results in FIG. 5 and FIG. 6 it can be seen that the capacity for polarisation diversity configuration is less than the space diversity configuration for an SNR of 0 dB. The highest gains are obtained from MIMO with high SNR's.

Another advantage to note here is that dual-polar elements can be co-located, and so if one can have two spatially separated antennas then one can just as easily have two spatially separated dual-polar elements. In the environment with no fading the spatial separation cannot provide any more orthogonal channels for MIMO, but the extra gain (6 dB; 3 dB from each end) can be used to improve the SNR which will provide extra capacity gain. Taking this further, MIMO can be applied to fixed wireless access systems employing outdoor directive eaves height subscriber antennas, by employing dual polar antenna elements at both the base and subscriber antennas. The outdoor antenna is required typically to avoid the high penetration losses associated with RF (radio frequency) penetration into buildings. Mounting at eaves height means that often there is a strong line-of-sight to the basestation. Consequently, directional antennas are used to maximise the signal-to-noise ratio, and minimise interference to the rest of the network. However, in these low fading environments the link capacity can be significantly increased by combining 2:2, 2:n or similar polarisation diversity MIMO with the high gain subscriber antennas and the basestation antenna.

Figure 7:
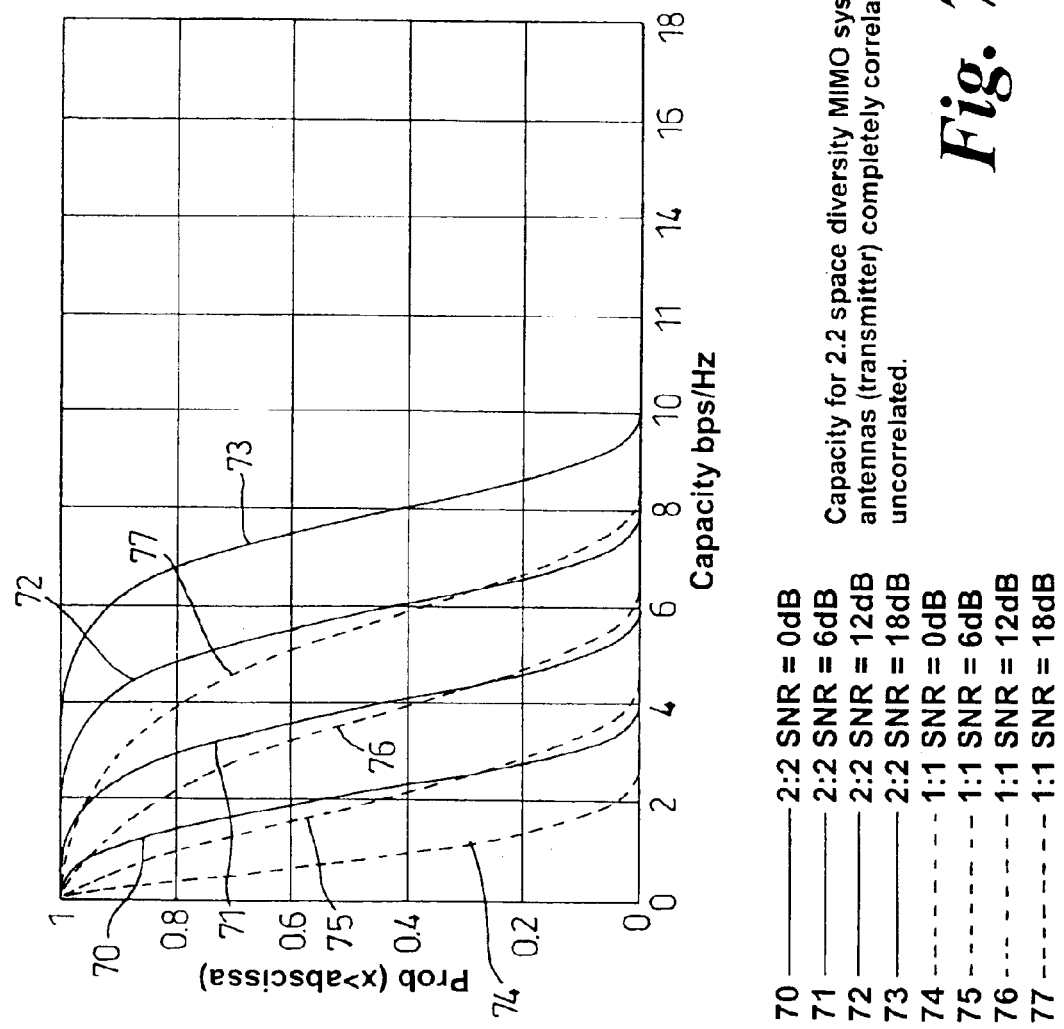
FIG. 7 is a graph of the theoretical capacity distribution for a 2:2 space diversity MIMO system with the basestation antennas (transmitter) completely correlated and the terminal completely uncorrelated, for different values of the signal to noise ratio.
Figure 8:
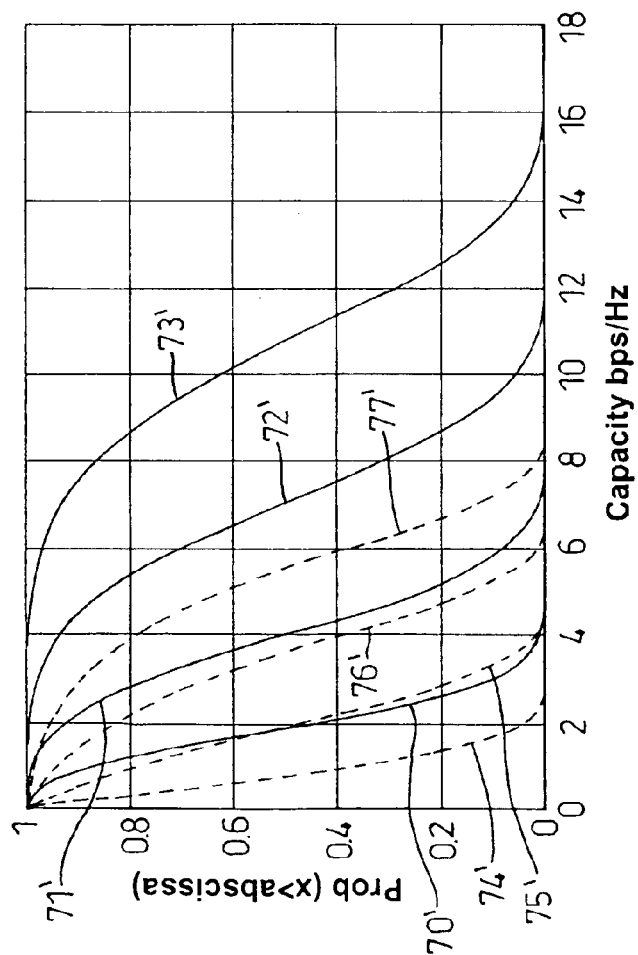
FIG. 8 is a graph similar to FIG. 7 but for a 2:2 polarisation diversity MIMO system (with no space diversity) and where there is no polarisation conversion in the environment.

Let us consider now perhaps a suburban or rural environment and a mobile terminal, i.e. some form of handheld device. In the given environments the angle spread at the basestation in particular may well be low, such that for a space diversity MIMO configuration the correlation between the antennas may well be high. For the polarisation diversity case, the correlation between antennas will be low, and the polarisation conversion may also be low. Consequently, there will be a distribution of values for the capacities of the two orthogonal paths and these are shown in FIG. 7 and FIG. 8. For the space diversity case it has been assumed that there is very little angle spread at the basestation and so the basestation antenna elements are completely correlated. For the polarisation diversity case the antenna elements at both ends are completely decorrelated, but it has been assumed that there is no polarisation conversion in the environment. Clearly, the capacity achieved with the polarisation diversity arrangement is greatest. Note that the distributions of the power gains for these cases are shown in FIG. 3 and FIG. 4.

Figure 9:
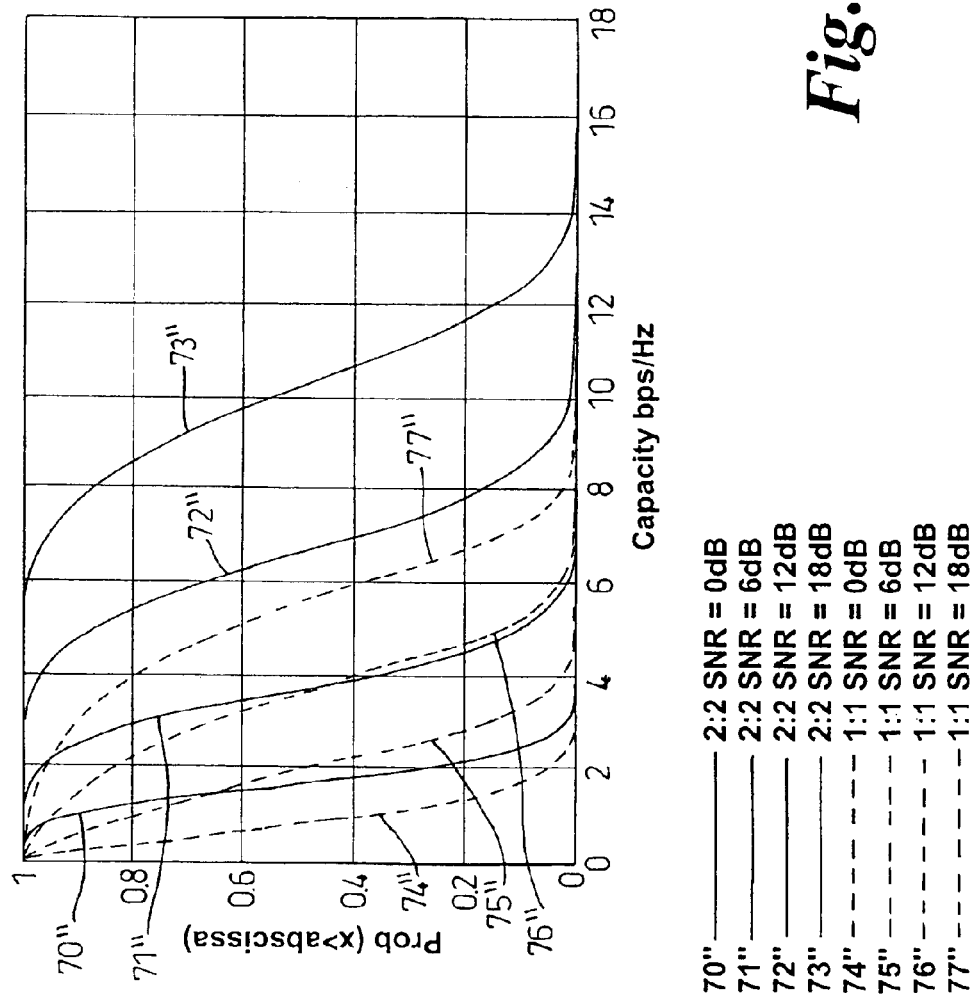
FIG. 9 is a graph similar to FIGS. 7 and 8 for a 2:2 space diversity MIMO system with antenna elements completely decorrelated.

Finally, if one looks at a rich multipath environment such that the space diversity elements become decorrelated at both ends, and again Rayleigh fading is assumed for all paths, then the capacity distribution obtained is as shown in FIG. 9.

In this environment the polarisation conversion is likely to be quite high. If we assume that the cross-polar ratio goes to 0 dB then the capacity curves for the 2:2 polarisation diversity MIMO configuration reduce exactly to that shown in FIG. 9, and the two configurations become equivalent. This also occurs for a 2:4, 2:n or similar polarisation diversity MIMO configuration.

Figure 10:
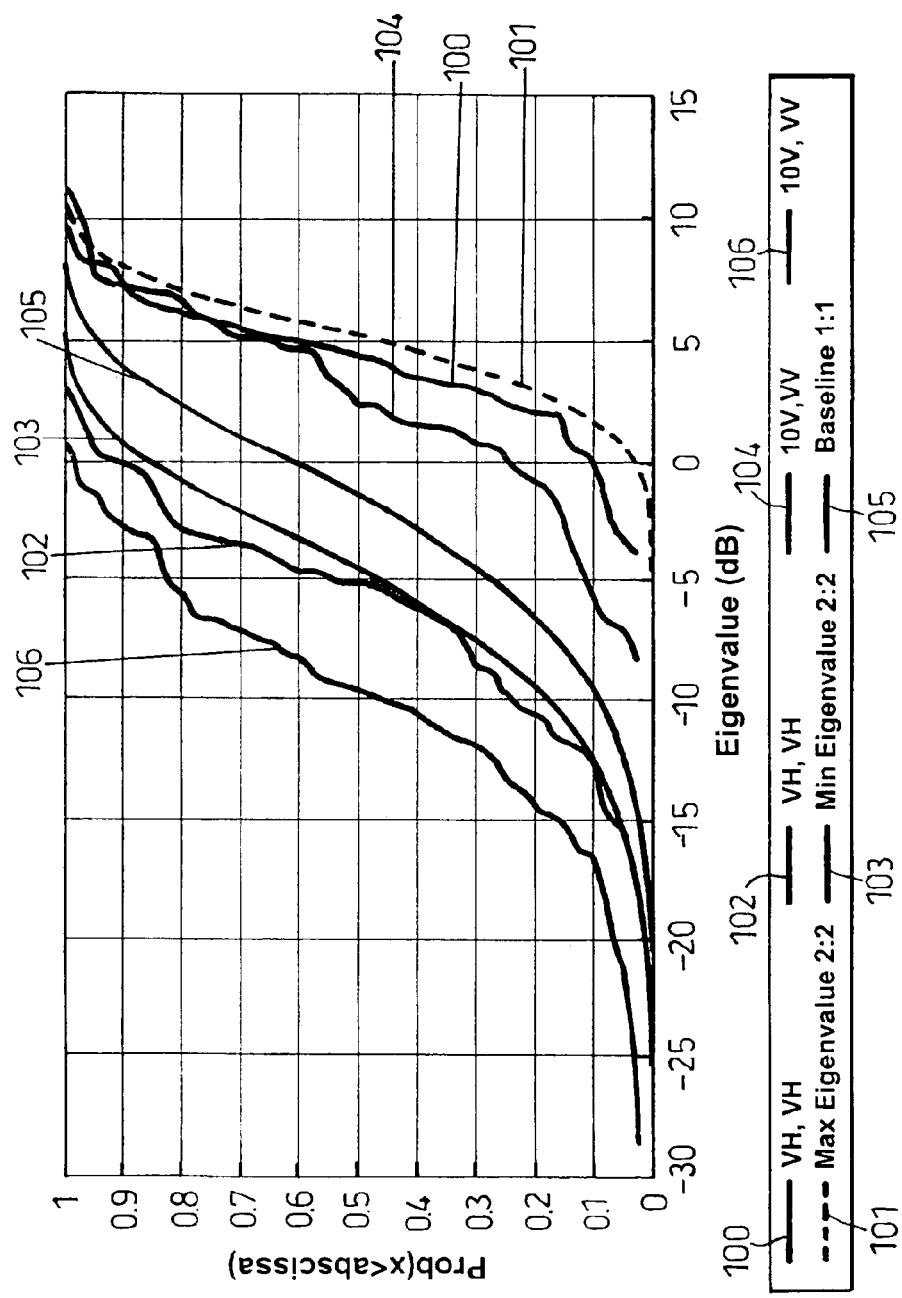
FIG. 10 is a graph of empirical results; it shows measured distributions for the power gains for the orthogonal MIMO paths for 2:2 space and polarisation diversity configurations.

Measurements for a 2:2 MIMO system have clearly shown that polarisation diversity performs better than space diversity antenna configurations. This finding is extendable to 2:n MIMO systems and other suitable MIMO configurations. The measurements were taken using an outdoor basestation and an indoor subscriber terminal in a suburban environment. The results for the power gains of the two orthogonal MIMO paths are shown in FIG. 10. The path gains for the polarisation diversity antenna configuration are higher than that obtained for the space diversity antenna configuration. Note that a 10 wavelength separation was used for antennas at the basestation and a 0.5 wavelength separation for antennas at the subscriber for the space diversity configuration. Thus the measurements clearly show that polarisation diversity is more robust than space diversity.

As mentioned above, one advantage of MIMO systems which use only polarisation diversity instead of spatial diversity, is that line of sight situations can be accommodated. Four examples of situations in which MIMO systems with only polarisation diversity can be used are now described with reference to FIGS. 11 to 14 and many of these involve line of sight situations. In each of these examples, the antenna configurations are combined with any suitable space-time coding scheme to provide a MIMO system.

Figure 11:
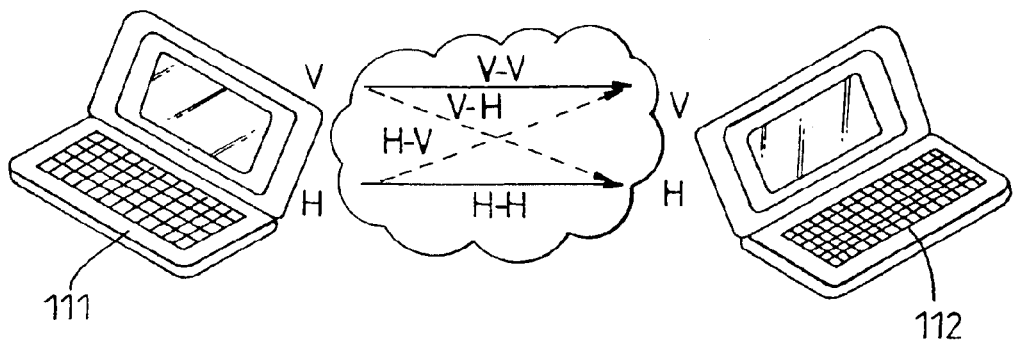
FIG. 11 is a schematic diagram of a MIMO communication link between two portable wireless communication terminals in a personal area network.

FIG. 11 shows two wireless portable devices 111, 112 such as portable digital assistants (PDAs) or laptop computers which are arranged to communicate with each other using a MIMO system that uses only polarisation diversity. Any suitable portable devices may be used and communication may be between different such portable devices. A plurality of polarised antenna elements are integrated into each portable wireless device 111, 112. Any suitable type of polarisation may be used such as honrizontal/vertical polarisation, left and right handed circular polarisation, ±45° polarisation or any other type. Each portable device 111, 112 has antenna elements which are either dual polarised i.e. operate at two different polarisations, or has pairs of antenna elements each member of such pairs being substantially orthogonally polarised with respect to the other member of the pair. The antennas could for example be printed dual-polar patch antennas, crossed dipole/monopole type elements, crossed slots or even right and left handed circularly polarised antennas.

Any suitable number of antenna elements can be used at each portable device and there may be more antenna elements at one of the devices than the other. However, in a preferred example, two dual polar antenna elements are used at each device, or two elements at one device and four at the other.

In the example shown in FIG. 11 a horizontal (H) and vertical (V) polarised antenna element is used at each portable device. The resulting MIMO system provides two orthogonal channels indicated by arrows V—V and H—H in FIG. 11. Because of scattering in the environment some polarisation conversion occurs and this is indicated by dotted arrows V–H and H–V in FIG. 11. In this situation, the portable devices are typically close together (e.g. <10 m apart) so that there is a high probability that a strong line of sight exists. However, because MIMO with polarisation diversity as opposed to spatial diversity is used such line of sight MIMO communication is effective.

Figure 12:
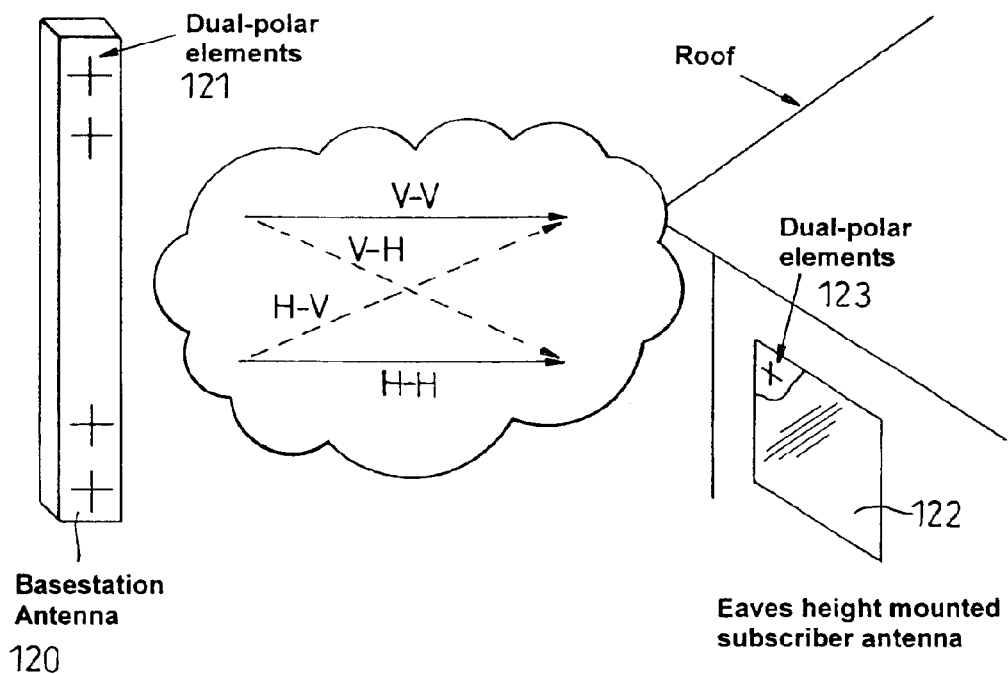
FIG. 12 is a schematic diagram of a MIMO communication link in a fixed wireless access situation.

FIG. 12 shows a fixed wireless access system with a basestation antenna 120 comprising a plurality of antenna elements 121 and a directional subscriber antenna 122 also comprising a plurality of antenna elements 123. The antenna elements in each case may be dual-polar or polarised as described with reference to FIG. 11. Also as for FIG. 11 any suitable number of antenna elements may be used however, preferably a 2:2 or 2:4 MIMO system is provided with horizontal (H) and vertical (V) polarisation. The directionality of the subscriber array 122 increases the signal to noise ratio and the 2:2 MIMO system forms two parallel orthogonal channels (H—H, V—V in FIG. 12). Even though a strong line of sight situation is involved the use of MIMO with polarisation diversity rather than spatial diversity enables effective communication to be established.

Figure 14:
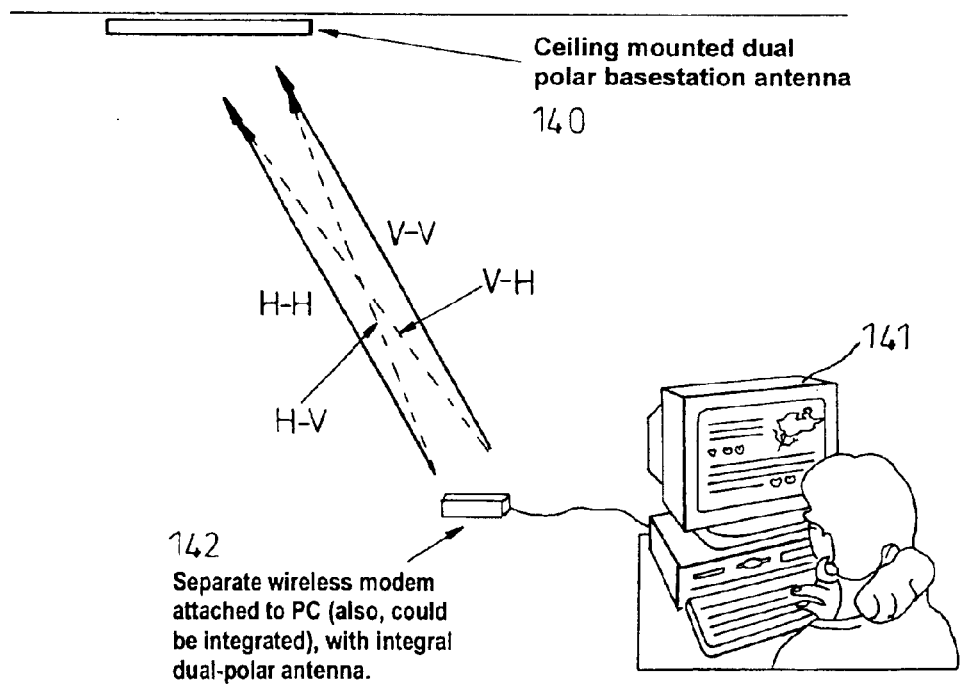
FIG. 14 is a schematic diagram of a MIMO communication link in a wireless local area network.

FIG. 14 shows an indoor wireless local area network (WLAN) basestation 140 which is shown as being ceiling mounted but which could be positioned in any suitable location. This basestation 140 communicates with a PC 141 which has a plurality of polarised antenna elements. In this example, a separate wireless modem 142 is used which is connected to the PC141. The wireless modem 142 has integral dual-polar antenna elements. This is just one example however, the antenna elements may be of any suitable type and connected to or integral with any suitable type of terminal. The bassstation 140 also has a plurality of polarised antenna elements and communicates with the user terminal 140 via a MIMO link. There is the possibility of strong line of sight situations, particularly in large open plan offices as well as large amounts of multipath scattering. The use of antenna elements of two polarisations ensures that there are at least two orthogonal paths at all locations with respect to the basestation. This also applies in the case that the basestation is outside and the user close to the basestation.

Figure 13:
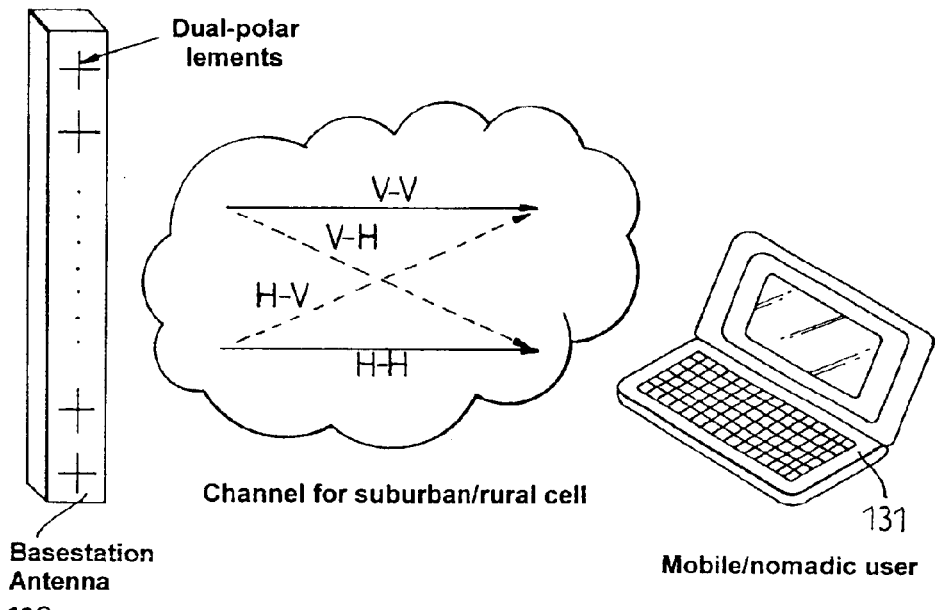
FIG. 13 is a schematic diagram of a MIMO communication link between a basestation and a mobile or nomadic user terminal.

FIG. 13 shows a basestation antenna array 130 comprising a plurality of polarised antenna elements. MIMO communication with a mobile or nomadic user terminal 131 occurs with that user terminal also having a plurality of polarised antenna elements as described above. In such a situation polarisation conversion is usually low, line-of-sight paths often exist and angle spreads are often low at both ends of the link. By using MIMO with polarisation diversity only (i.e. without spatial diversity) then link capacity can be increased as compared with using MIMO with spatial diversity only. In addition the antenna elements can be closely spaced and this enables them to be more easily integrated into a mobile terminal or other user terminal where space is restricted.

In another example, the basestation of FIG. 13 is modified to provide multiple antenna beams in addition to MIMO communication. This allows capacity to be further increased as compared with using MIMO communication alone. This is explained in more detail with reference to FIGS. 15A and 15B which show one example of how a MIMO system with polarisation diversity but not spatial diversity can be combined with a multi-beam antenna system.

Figure 2:
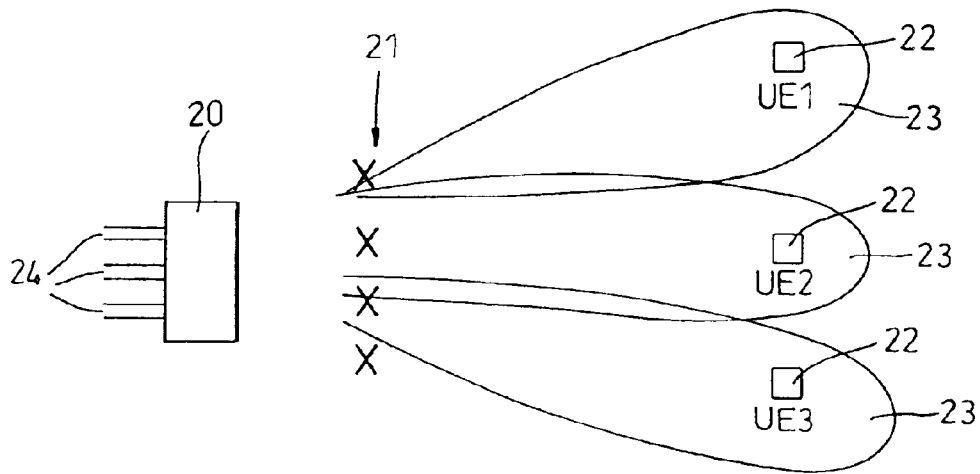
FIG. 2 is a schematic diagram of a prior art multi-beam wireless communications system.

As mentioned above with reference to FIG. 2, multi-beam antenna systems require closely spaced antenna elements, for example which have a spacing of one half a wavelength. FIG. 15A shows an example of a basestation antenna array 150 with such closely spaced antenna elements 151. In this case each antenna element is a column of six polarised antenna elements. Six such columns are used with a spacing of half a wavelength in azimuth. Two beam formers are used in conjunction with this array in order to form three antenna beams at each of two polarisations as illustrated in FIG. 15B. One beamformer forms three antenna beams A1, A2, A3 at one polarisation, say +45° whilst the other beamformer forms three antenna beams B1, B2, B3 at another polarisation say −45°. Any suitable type of beamformers may be used such as the modified Butler Matrix beamformer illustrated in FIG. 22.

Figure 22:
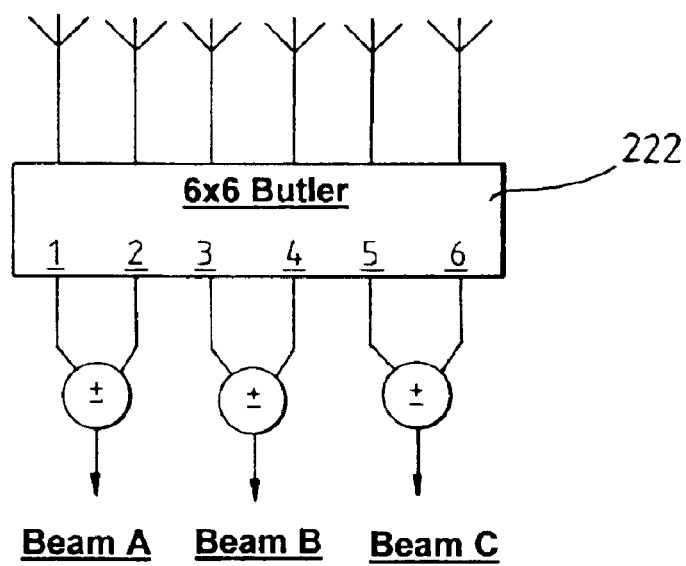
FIG. 22 is a schematic diagram of a beamformer for use in an embodiment of the present invention.

FIG. 22 is a schematic diagram of a modified Butler Matrix beamformer. This shows a six by six Butler Matrix 222 which is implemented with a planar structure comprising a concentric layout of hybrid couplers, readily realised in triplate. Three antenna beams (A, B, C) are generated by pairing up adjacent beam ports as shown. This is described in more detail in our co-pending U.S. patent application Ser. No. 09/394,835 which is also assigned to Nortel Networks and which is incorporated herein by reference. A particular advantage of using such beamformers is that insertion loss is minimised.

The basestation is also arranged to use space-time coding over pairs of antenna beams such that beams A1, B1 are used to form a first MIMO communications link with a subscriber station 152 whilst beams A2, B2 form a second MIMO link with subscriber station 153 (or any other suitable subscriber station serviced by beams A2, B2) and beams A3, B3 form a third MIMO link with any subscriber stations (e.g. 154) serviced by beams A3, B3.

Because polarisation diversity only is used for the MIMO system it is possible to combine a MIMO and multi-beam arrangement in this way. This gives the advantage of increased capacity because to first order, the capacity gains from multi-beam and MIMO systems are independent. The resulting hybrid system shares the benefits of both approaches.

A particular embodiment of a combined MIMO and multi-beam arrangement is now described which is suited to either mobile or fixed wireless applications. FIG. 16 shows the case when a fixed wireless application is involved. A basestation 160 provides a communications link to a customer premises equipment (CPE) 161 comprising four polarised antenna elements with four receiver chains and two transmitter chains. The basestation is preferably tri-sectored and in each sector a three beam output on two polarisations is provided with 2-branch MIMO transmission on the downlink as described with reference to FIGS. 15A and 15B.

Figure 17:
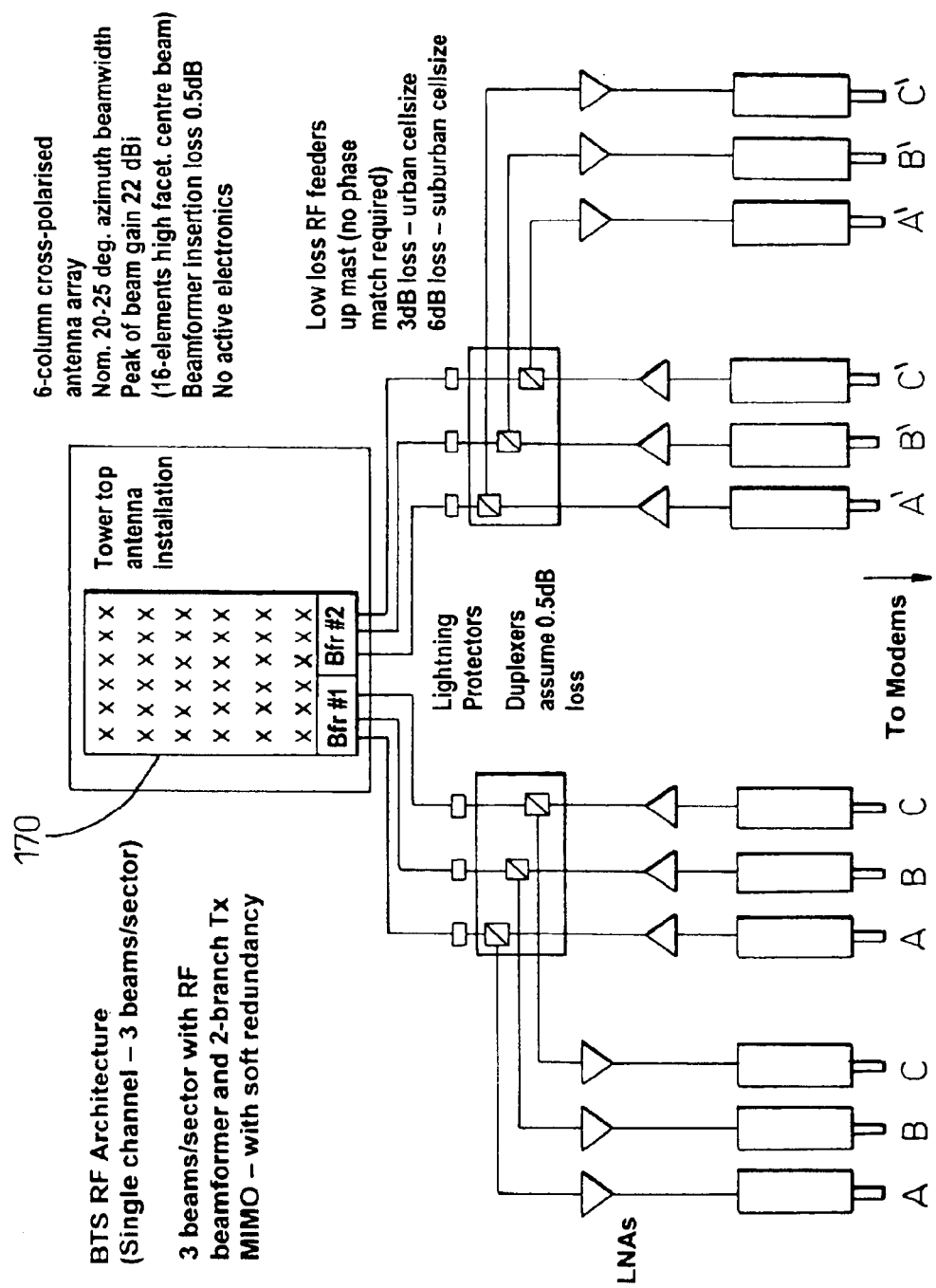
FIG. 17 is a schematic diagram of the radio frequency architecture of a basestation which provides both MIMO and multi-beam communications.
Figure 18:
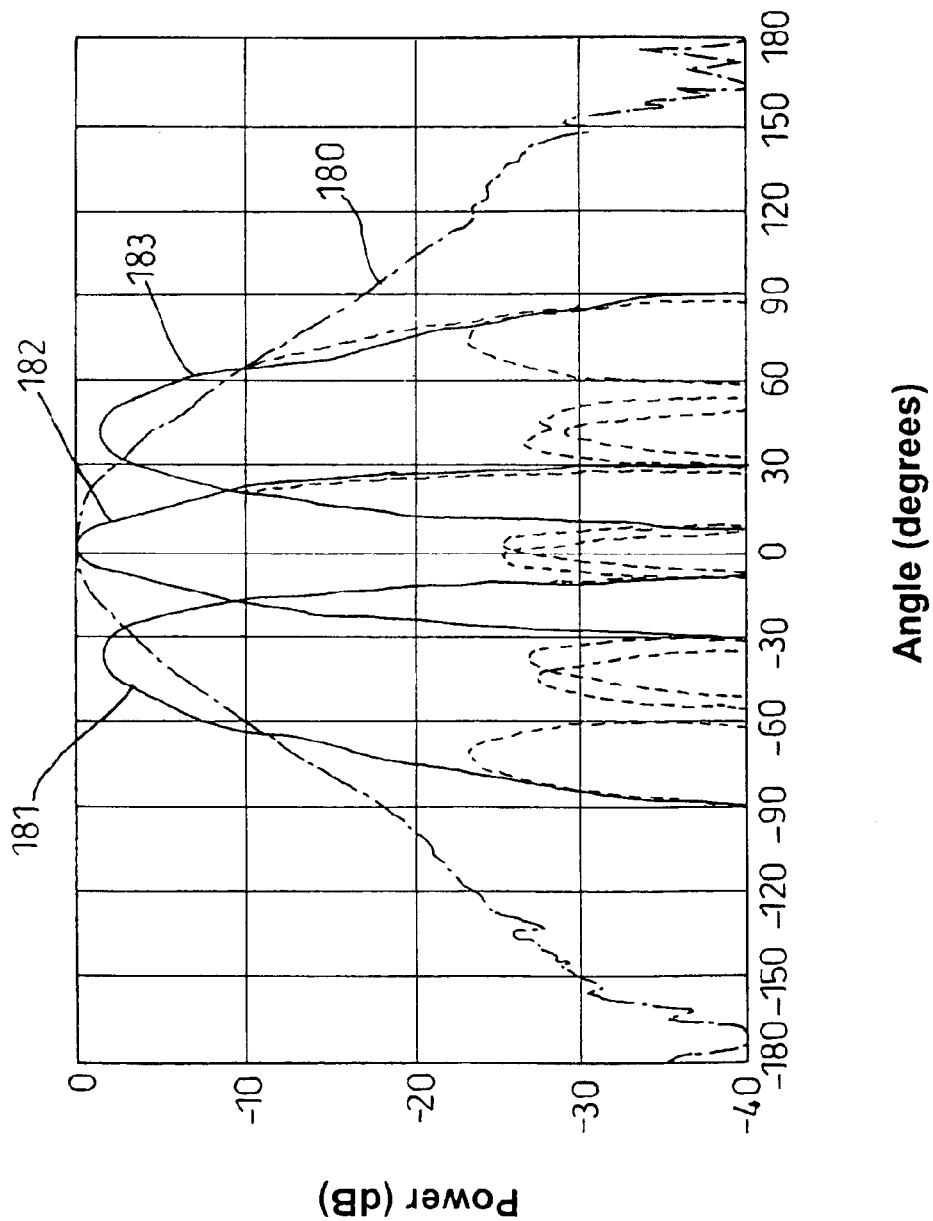
FIG. 18 is an antenna beam pattern for the antenna array of FIG. 17.

FIG. 17 shows the basestation (BTS) architecture. A six-column, cross-polarised antenna array 170 is provided on each facet of the basestation and is common to both downlink and uplink designs. Each antenna facet serves a single sector of the basestation's cell and uses twin radio frequency (RF) beamformers in order to provide three beam outputs on both of the two polarisations. It is also possible to provide different numbers of beam outputs. For example, four beams per sector gives greater capacity but at the expense of requiring more RF feeder cables and more up-converter and down-converter modules. Any suitable beamformers can be used and in a preferred example orthogonal 6-way modified Butler Matrix beamformers (e.g see FIG. 22) are used which provide a low loss solution (an orthogonal beamformer is in itself nominally lossless) and give suitable beamwidths, cross-over between adjacent beams and side lobe levels. FIG. 18 shows the resulting beam patterns plotted, for comparison purposes, along with a conventional 65° beamwidth full sector pattern (see line 180) that is consistent with a tri-cellular deployment. This beam pattern was obtained for a 45° angled dipole element array and shows three main beams 181, 182, 183. The advantage of the beam pattern obtained is that the degree to which adjacent beams overlap is reduced in order to minimise the interference experienced in a significant proportion of the sector, especially at close ranges. Low cross-over or cusping levels are therefore advantageous along with suppressed sidelobes. The beams are relatively narrow (about 25° beamwidth or less) and spaced about every 40°.

Preferably the beamformers are integral with the antenna facet because this eliminates the need for active phase calibration through the RF chain. However, this is not essential. Beamformers that are not integral in this way can be used.

In addition to the multi-beam sectorisation, 2-branch MIMO transmission on the downlink is provided. MIMO transmission is accomplished by making use of the polarized antenna array 170. Identical beam sets are formed on the two orthogonal polarisations and transmission is then coded across corresponding pairs of beams using any suitable space-time coding scheme. Such an approach provides the benefit of both multi-beam and STC from a single, compact antenna aperture.

On the uplink the same multibeam configuration as for the downlink is preferably used with polarisation diversity. The beam directivity provides significant interference reduction. Subscribers located at beam cusps will tend to suffer degraded link performance compared with subscribers located at the peak of the beam. However, degradation is minimised by coherently combining adjacent beam outputs (on both polarisations) to achieve enhanced gain and increased diversity benefit.

The present invention is particularly concerned with the downlink (basestation to mobile) or other user terminal where capacity loading is likely to be greatest, for example in provision of services to end users such as web pages and internet applications.

Figure 19:
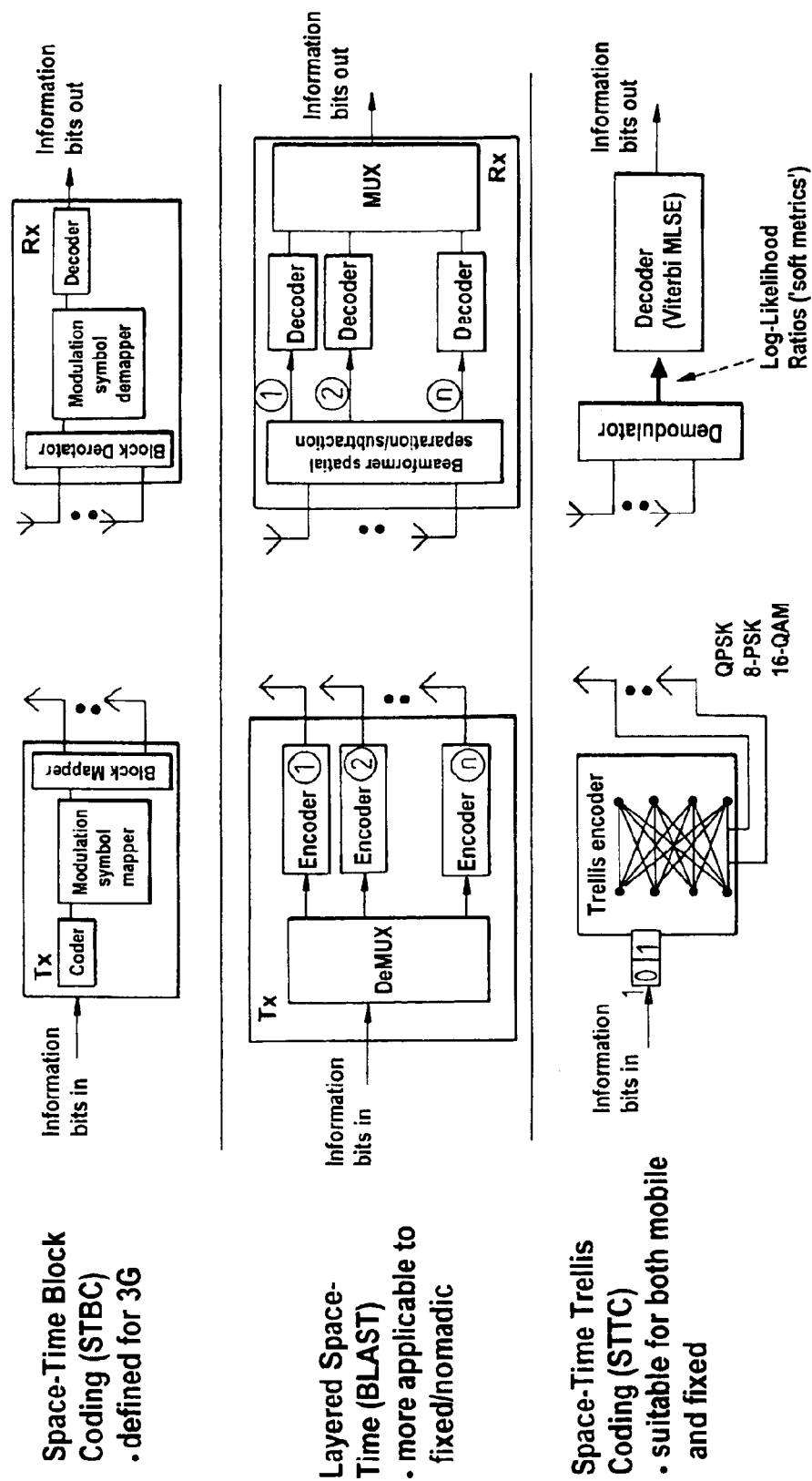
FIG. 19 is a schematic diagram of three space-time coding methods, space-time block coding, layered space-time and space-time trellis coding.

As mentioned above, any suitable type of space-time coding method may be used. For example space-time block coding (STBC) as illustrated in the top layer of FIG. 19; layered space-time (BLAST) which is more applicable to fixed or nomadic applications and is illustrated in the middle layer of FIG. 19; and spacetime trellis coding (STTC) which is suitable for both mobile and fixed applications and is illustrated in the bottom layer of FIG. 19.

Figure 20:
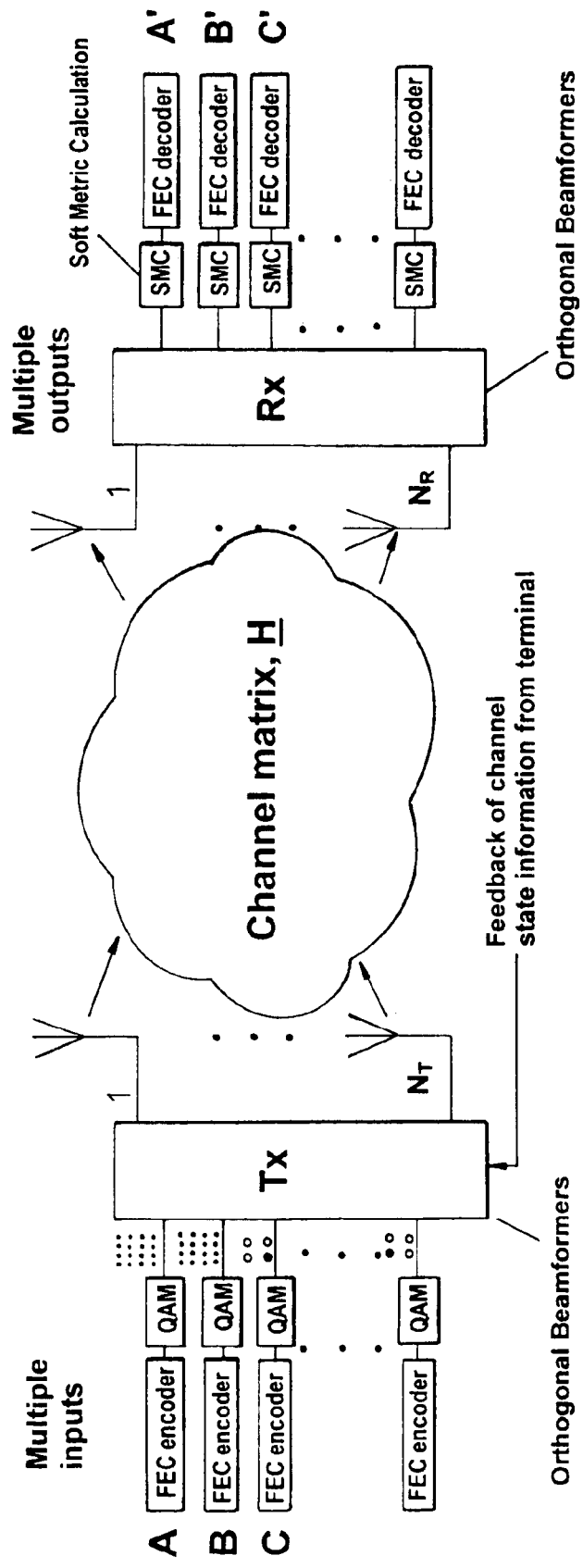
FIG. 20 is a schematic diagram of a feedback space-time coding method using separated subchannels.

Another suitable method is that of feedback space-time coding with separated subchannels as illustrated in FIG. 20. This type of feedback or eigen-mode STC simplifies the receive processing by decoupling parallel streams of the transmitter. It requires feedback of MIMO channel weights from receive to transmit and is most suitable for low-Doppler fixed or nomadic applications.

Figure 21:
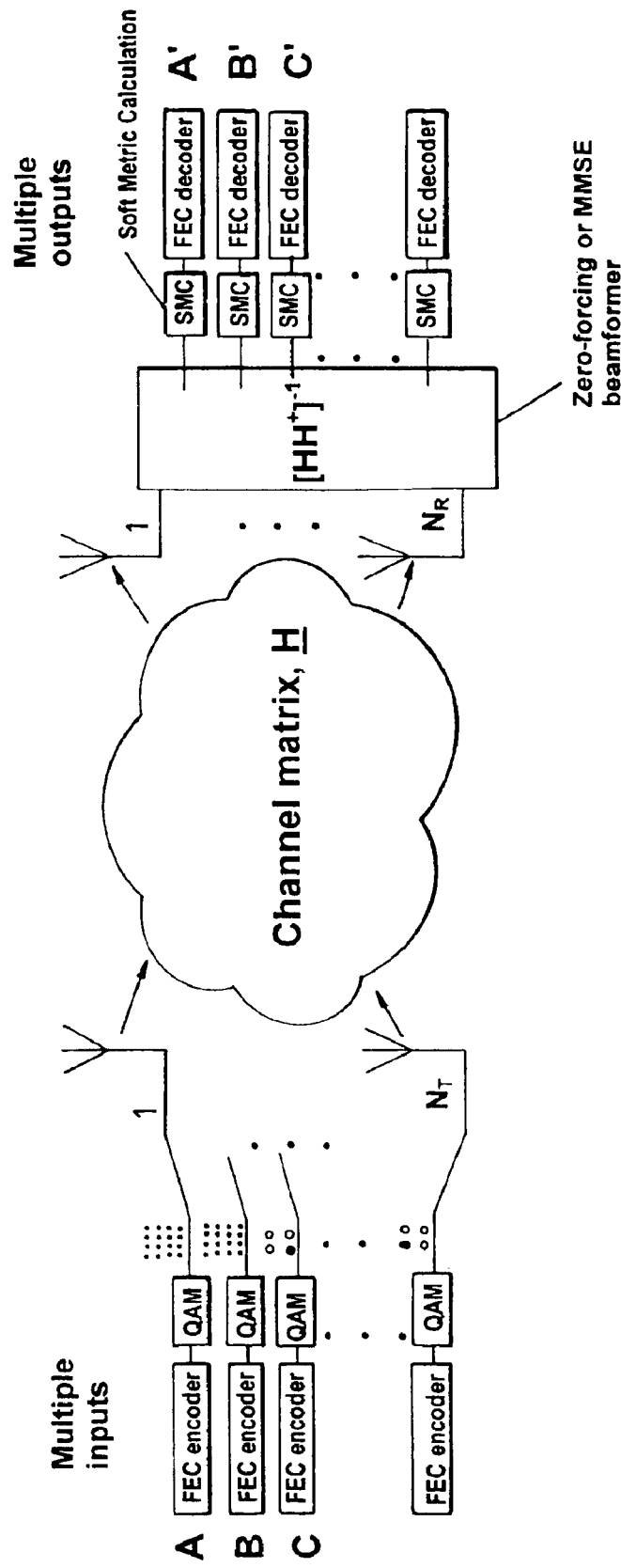
FIG. 21 is a schematic diagram of spatial multiplexing space-time coding method also known as BLAST.

Spatial multiplexing space-time coding can also be used as illustrated in FIG. 21. In this method, independent coded data streams are sent to different transmit antennas. The receiver is required to carry out spatial processing to separate the different transmissions. This requires distinct spatial signatures at the receiver and performance is limited by the minimum eigen values of $HH^*$ where H is the channel matrix. When the eigen values are imbalanced, performance is poorer than for eigen-mode STC but the feedback requirement is vastly reduced.

In the embodiments described above in which MIMO and multi-beam systems are combined, a space-time coding MIMO communications method is used for each antenna beam link. For example, consider the case with three antenna beams, each at two polarisations. One of those antenna beams, and the corresponding beam at the other polarisation serve one or more subscribers or users that are located within a geographical area served by those beams. MIMO, space-time coded communications between the base station and those users occurs via the pair of antenna beams. By using MIMO, the communications rate to those users can be increased. The same occurs for users in the geographic regions served by the other two pairs of antenna beams. Thus capacity is increased as compared with using three pairs of antenna beams with no MIMO communications.

It is also possible however, to simultaneously provide both MIMO space-time coded communications, and non-MIMO, non-space-time coded communications from one or more of the antenna beams. This is advantageous in that legacy user equipment which is non-MIMO compliant is operable whilst at the same time MIMO compliant user equipment can be used. The user or subscriber equipment is arranged to be able to distinguish between MIMO and non-MIMO communications packets using any suitable method, such by having different carrier frequencies for the two types of signal. The basestation is arranged to multiplex the MIMO and non-MIMO packets such that both these types of communication are transmitted from the basestation simultaneously.

Any range or device value given herein may be extended or altered without losing the effect sought, as will be apparent to the skilled person for an understanding of the teachings herein.

A range of applications are within the scope of the invention. These include situations in which it is required to provide a MIMO wireless communications system which operates without spatial diversity but instead with polarisation diversity. For example, in line of sight situations or in cases where MIMO and multi-beam systems are to be combined.

What is claimed is:

1. A multiple-input multiple-output (MIMO) wireless communications system comprising:
   (i) a plurality polaised antenna array located at a transmitter, the array comprising a plurality of transmit antenna elements;
   (ii) a beamformer for coherently combining elements of a same polarisation to form a first directional beam having a first polarisation and a second directional beam having a second polarisation; and
   (iii) a plurality of receive antenna elements located at a receiver;
   wherein the first and second beams provide two independent MIMO channels between the transmitter and the receiver.

2. A MIMO wireless communications system as claimed in claim 1 wherein each of said transmit antenna elements is polarised at one of two first substantially orthogonal polarisations.

3. A MIMO wireless communications system as claimed in claim 2 wherein each of said receive antenna elements is polarised at one of two second substantially orthogonal polarisations.

4. A MIMO wireless communications system as claimed in claim 3 wherein said two first substantially orthogonal polarisations are different from said two second substantially orthogonal polarisations.

5. A MIMO wireless communications system as claimed in claim 1 wherein said plurality of transmit antenna elements comprises one or more dual-polar-elements each such dual-polar-element being two co-located antenna elements operable from a single antenna aperture.

6. A MIMO wireless communications system as claimed in claim 1 which is arranged to operate at a particular wavelength and and wherein the inter-element spacing of the transmit antenna elements is less than one of the particular wavelength.

7. A MIMO wireless communications system as claimed in claim 1 which is arranged to provide both non-MIMO communications and MIMO communications substantially simultaneously.

8. A MIMO wireless communications system as claimed in claim 1, comprising one or more beamformers integral with the transmit antenna elements.

9. A MIMO wireless communications system as claimed in claim 1 wherein said beamformer forms a plurality of pairs of antenna beams, each pair comprising a first antenna beam of a first polarisation and a second antenna beam, substantially identical to the first but provided at a second polarisation different from the first polarisation.

10. A MIMO wireless communications system as claimed in claim 9 wherein each of said pairs of antenna beams is arranged to provide a two-branch MIMO input.

11. A MIMO wireless communications system as claimed in claim 1 which is selected from a 2:2 and a 2:4 MIMO system.

12. A MIMO wireless communications system as claimed in claim 1 which is selected from a fixed wireless access system, a personal area network, a wireless local area network, and a mobile communications network.

13. A MIMO wireless communications system as claimed in claim 1 wherein each of said transmit antenna elements comprises a column of antenna elements.

14. A multiple-input multiple-output wireless communications method comprising the steps of:
   (i) forming a first directional beam having a first polarisation and a second directional beam having a second polarisation from a transmit dual polarised antenna array comprising a plurality of antenna elements by coherently combining elements of a same polarisation;
   (ii) transmitting a space-time coded signal from a transmit antenna array; and
   (iii) receiving the space-time coded signal at a receive antenna arrangement comprising a plurality of receive antenna elements;
   wherein said first and second beams provide two independent MIMO channels between the transmit antenna array and the receive antenna arrangement.

15. A method as claimed in claim 14 which further comprises:
   (i) positioning the transmit antenna array and the receive antenna arrangement such that a line of sight path is present between those two arrangements; and
   (ii) using said transmit antenna array to transmit the space-time coded signal to the receive antenna arrangement at least partly along said line of sight path.

16. A method as claimed in claim 14 which further comprises transmitting a non-space-time coded signal from the transmit antenna array simultaneously with the space-time coded signal.

17. An antenna arrangement for use in a multiple-input multiple-output (MIMO) wireless communications system, said antenna arrangement comprising
   a dual polarised antenna array comprising a plurality of transmit antenna elements and
   a beamformer for coherently combining elements of a same polarisation to form a first directional beam having a first polarisation and a second directional beam having a second polarisation, wherein the first and second beams provide two independent MIMO channels between said antenna arrangement and a receive antenna arrangement.

18. An antenna arrangement as claimed in claim 17 which is arranged to operate at a particular wavelength and wherein the transmit antenna elements have an inter-element spacing which is less than one of the particular wavelength.

19. An antenna arrangement as claimed in claim 17 which is also suitable for use in a non-MIMO communications system simultaneously with use in the MIMO communications system.

20. A method of operating an antenna arrangement as claimed in claim 17 which comprises transmitting space-time coded signals from said antenna arrangement.

21. A method of operating an antenna arrangement as claimed in claim 17 which further comprises a plurality of receive antenna elements and wherein said method comprises receiving space-time coded signals at said antenna arrangement, said signals being polarisation diverse and having a substantially insignificant amount of spatial diversity.

* * * * *